United States Patent [10] Patent No.: US 12,420,926 B2
Bushmitch et al. (45) Date of Patent: Sep. 23, 2025

(54) LAYERED MULTI-MODULE AUTONOMOUS SYSTEMS

(71) Applicants: The MITRE Corporation, McLean, VA (US); ARMY, Redstone Arsenal, AL (US)

(72) Inventors: Dennis Bushmitch, Newark, DE (US); John H. Fikus, Interlaken, NJ (US); Robert Monto, Newark, DE (US); Kevin Gemp, Clarksville, MD (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 18/584,630

(22) Filed: Feb. 22, 2024

(65) Prior Publication Data

US 2025/0269961 A1 Aug. 28, 2025

(51) Int. Cl.
*B64D 1/22* (2006.01)
*B64D 1/10* (2006.01)
(Continued)

(52) U.S. Cl.
CPC ............... *B64D 1/22* (2013.01); *B64D 1/10* (2013.01); *B64U 10/14* (2023.01); *B64U 30/299* (2023.01); *B64U 2101/60* (2023.01)

(58) Field of Classification Search
CPC ... B64D 1/10; B64D 1/12; B64D 1/22; B64U 20/40; B64U 30/299; B64C 27/20
See application file for complete search history.

(56) References Cited

U.S. PATENT DOCUMENTS 8,774,982 B2  7/2014  Oakley et al.
9,981,740 B2  5/2018  Dunkelberger et al.
(Continued)

FOREIGN PATENT DOCUMENTS

CN  108248865 A  *  7/2018  ............... B64D 1/12
CN  210469317 U     5/2020
(Continued)

OTHER PUBLICATIONS

(Dec. 5, 2021). "7 Strangest New Drones," located at https://www.youtube.com/watch?v=wci0pJoMOqQ. (4 pages).
(Continued)

*Primary Examiner* — Arfan Y. Sinaki
(74) *Attorney, Agent, or Firm* — Morrison & Foerster LLP (57) ABSTRACT

Described herein, according to various aspects, are unmanned aerial systems (UAS) that can carry multiple layered modules on a mission. An exemplary UAS may include layered modules that contain functional components such as communication relay modules, armor, batteries, charging modules, propulsion modules, GPS modules, sensor modules, processors, databases, lights, explosive devices, electronic attack devices, payloads, flotation and/or buoyancy control devices, etc. The layered modules can be easily added and/or removed, which allows the UAS to be reconfigured to perform different missions without significantly modifying the structure of the UAS. The layered modules can be deployed at specific locations along a flight path of the UAS to perform location-dependent functionalities (e.g., surveillance of a target region). Multiple layered modules can be coupled to expand upon the payload capacity and the functionality of the UAS. Such an UAS can thus provide a versatile, multifunctional vessel for performing (Continued)

different autonomous missions for military and commercial applications.

26 Claims, 7 Drawing Sheets

(51) Int. Cl.
  *B64U 10/14* (2023.01)
  *B64U 30/299* (2023.01)
  *B64U 101/60* (2023.01)

(56) References Cited

U.S. PATENT DOCUMENTS

| | | | |
|---|---|---|---|
| 10,696,394 | B2 | 6/2020 | Chang |
| 10,800,521 | B1 | 10/2020 | Grenier et al. |
| 11,196,478 | B1 | 12/2021 | Nagelberg et al. |
| 11,383,835 | B2 * | 7/2022 | Hörtner ............... B64U 50/37 |
| 11,480,958 | B2 | 10/2022 | Paczan et al. |
| 11,634,219 | B2 | 4/2023 | Rowse et al. |
| 11,636,771 | B2 | 4/2023 | Barker et al. |
| 2017/0351933 | A1 * | 12/2017 | Bleiweiss ............ G06T 7/0004 |
| 2024/0185464 | A1 * | 6/2024 | Oi ..................... H04N 17/002 |

FOREIGN PATENT DOCUMENTS

| | | | | |
|---|---|---|---|---|
| CN | 111959784 | A * | 11/2020 | ............ B63C 9/01 |
| CN | 212752261 | U | 3/2021 | |
| CN | 112758328 | A * | 5/2021 | ............ B63C 9/01 |
| CN | 114228992 | A | 3/2022 | |
| CN | 116002088 | A | 4/2023 | |
| GB | 2573536 | A | 11/2019 | |

OTHER PUBLICATIONS (Feb. 8, 2022). "Mid-air Reconfigurable Quadcopter" located at https://www.youtube.com/watch?v=IRF4gJKMyaU. (2 pages).

(Jul. 9, 2023). "New type of Drone is Game-Changing!" located at https://www.youtube.com/watch?v=m1FNcNvboSg. (2 pages).

(Oct. 9, 2022). "7 Incredible New Drones," located at https://www.youtube.com/watch?v=yMz_rtiM7FU. (2 pages).

Chowdhury et al. (Jan. 2016). "New Modular Product-Platform-Planning Approach to Design Macroscale Reconfigurable Unmanned Aerial Vehicles," Journal of Aircraft 53(2):14 pages.

Da Silva Ferreira et al. (Jun. 2020). "Drone Reconfigurable Architecture (DRA): a Multipurpose Modular Architecture for Unmanned Aerial Vehicles (UAVs)," Journal of Intelligent & Robotic Systems 99: 18 pages.

* cited by examiner

LAYERED MULTI-MODULE AUTONOMOUS SYSTEMS

STATEMENT REGARDING FEDERALLY SPONSORED RESEARCH OR DEVELOPMENT

This invention was made with Government support under U.S. Government Contract No. W56KGU-18-D-0004, awarded by the Army. The Government has certain rights in this invention.

FIELD

The present invention relates generally to autonomous systems and, more particularly, to modular unmanned systems.

BACKGROUND

Autonomous (i.e., unmanned) systems are used in modern military and commercial platforms to perform a wide variety of missions, such as reconnaissance, terrain mapping, and payload delivery. There are increasing demands to develop autonomous systems that can be reconfigured to perform different missions without significant modifications to the structures of the autonomous systems. These autonomous systems can be dynamically reconfigured during a mission to adjust to real-time changes in mission parameters.

An unmanned aerial system (UAS) is a type of autonomous system that can include an unmanned aircraft (e.g., a drone) for performing airborne operations, a ground control station that provides human and/or computer-based control for the unmanned aircraft, and a wireless communication link between the unmanned aircraft and the ground control station. In modern military and commercial applications, a UAS is often used on missions to explore and map areas that are not accessible to humans, such as sub-surface tunnels. However, the UAS is limited in its exploration range by dangerous terrain (e.g., narrow corridors), its power capacity, its lifting capacity, and its communication range relative to the ground control station. For example, a UAS may need to stay within a certain distance of the ground control station in order to maintain the wireless communication link, which restricts the exploration range of the UAS.

SUMMARY

According to various embodiments, a multi-module unmanned aerial system (UAS) can carry multiple layered modules on a mission. The layered modules may contain functional components such as communication relay modules, armor, batteries, charging modules, propulsion modules, GPS modules, sensor modules, processors, databases, lights, explosive devices, electronic attack devices, payloads, audiovisual devices, flotation and/or buoyancy control devices, etc. The layered modules can be easily added and/or removed, which allows the UAS to be reconfigured during the mission to perform different functions without significantly modifying the structure of the UAS. According to various embodiments, the layered modules can be deployed at specific locations along a flight path of the UAS to perform location-dependent functionalities (e.g., surveillance of a target region). Multiple layered modules can be coupled to expand upon the payload capacity and the functionality of the UAS. The UAS can provide a versatile, multifunctional vessel for performing different autonomous missions for military and commercial applications.

According to various embodiments, the layered modules may include a primary functional module configured to guard the propellers of the UAS, to provide structural integrity to the UAS, and/or to provide battery power to the UAS. The layered modules may further include one or more deployable functional modules configured to attach to and detach from the primary functional module and/or to attach to and detach from each other in any order. The layered modules may be modular (i.e., can be switched out with one another) to enable easy reconfiguration of the UAS for different types of missions. The UAS may determine an appropriate flight path and deploy the layered modules at suitable drop locations along the flight path. Deploying the layered modules reduces the weight of the UAS, which reduces power usage for the remainder of the flight path. The UAS may also pick up layered modules that have previously been deployed along the flight path (e.g., picking up additional battery modules to extend the exploration range of the UAS).

According to various embodiments, the UAS includes: one or more propellers; and a plurality of layered modules comprising: a primary module configured to guard the one or more propellers; and one or more deployable modules configured to attach to and detach from each other, wherein at least one of the one or more deployable modules is configured to attach to and detach from the primary module. The one or more deployable modules can be configured to be added or dropped during flight of the UAS. The UAS can be configured to perform flight adjustments to compensate for adding or dropping the one or more deployable modules.

In any of these embodiments, the primary module and/or the one or more deployable modules can include at least one of armor, one or more batteries, one or more charging devices, one or more propulsion modules, one or more GPS modules, one or more sensor modules, one or more lights, one or more explosive devices, one or more electronic attack devices, one or more storage compartments, one or more payloads, one or more audiovisual devices, or one or more flotation and/or buoyancy control devices.

In any of these embodiments, the one or more deployable modules can include one or more communication relay modules. A communication relay module of the one or more communication relay modules can include one or more electronic devices configured to transmit signals between the UAS, a different communication relay module of the one or more communication relay modules, and/or an origin station.

In any of these embodiments, the UAS can be configured to perform simultaneous localization and mapping. Deploying a module of the one or more deployable modules can improve resolution and/or accuracy of the simultaneous localization and mapping function of the UAS.

In any of these embodiments, each module of the one or more deployable modules can be stacked vertically above and/or below another module of the one or more deployable modules. A top-most and/or a bottom-most deployable module of the one or more deployable modules can be configured to attach to and detach from the primary module.

In any of these embodiments, the one or more deployable modules can be configured to be arranged concentrically inside and/or outside of another module of the one or more deployable modules. An inner-most and/or an outer-most deployable module of the one or more deployable modules can be configured to attach to and detach from the primary module.

In any of these embodiments, the UAS can include one or more sensors configured to collect environmental data associated with one or more of terrain, atmospheric conditions, altitude, and GPS location. The one or more sensors can include a camera and the one or more deployable modules can include a visual code, such that if a module of the one or more deployable modules is dropped during flight of the UAS, the camera can be configured to detect an orientation and/or position of the dropped module based on the visual code.

According to various embodiments, a method for operating the UAS, which includes a plurality of layered modules, includes: receiving, from one or more sensors of the UAS, environmental data; determining one or more drop/pickup locations for one or more deployable modules of the plurality of layered modules based, at least in part, on the environmental data; and deploying the one or more deployable modules in the one or more drop/pickup locations. The method can further include programming the one or more deployable modules based on the environmental data. Programming the one or more deployable modules can include setting one or more of frequency, power, signal type, network topology, and transmission rate based on the environmental data. The environmental data can include one or more of terrain, atmospheric conditions, altitude, and GPS location.

In any of these embodiments, determining the one or more drop/pickup locations for the one or more deployable modules can be further based on a predictive model. The predictive model can be a machine-learning algorithm configured to generate a path of the UAS based on the environmental data.

In any of these embodiments, the one or more deployable modules can include one or more communication relay modules configured to be deployed from the UAS. The one or more drop/pickup locations can be locations which enable the one or more communication relay modules to maintain communication between each other. The UAS can be configured to maintain communication with an origin station via the one or more communication relay modules.

In any of these embodiments, the method can further include optimizing a path of the UAS between the one or more drop/pickup locations for the one or more deployable modules. Optimizing the path of the UAS can be based on optimizing power consumption of the UAS. Optimizing the path of the UAS can be based on maximizing a communication path length between the UAS and an origin station. Optimizing the path of the UAS can be based on maximizing a travel path length between the UAS and an origin station.

In any of these embodiments, the one or more deployable modules can include at least one of armor, one or more batteries, one or more charging devices, one or more propulsion modules, one or more GPS modules, one or more sensor modules, one or more lights, one or more explosive devices, one or more electronic attack devices, one or more audiovisual devices, one or more storage compartments, one or more payloads, or one or more flotation and/or buoyancy control devices.

In any of these embodiments, the method can further include receiving location data associated with one or more deployed modules; maneuvering the UAS to one or more drop/pickup locations based on the location data; and picking up the one or more deployed modules via the UAS. Upon being picked up via the UAS, the one or more deployed modules can become part of the one or more deployable modules.

BRIEF DESCRIPTION OF THE DRAWINGS

The invention will now be described, by way of example only, with reference to the accompanying drawings, in which.

DETAILED DESCRIPTION

Described herein, according to various embodiments, are examples of a multi-module unmanned aerial system (UAS) that can carry multiple layered modules on a mission. The UAS can be, for example, a drone, unmanned aircraft, or other autonomous vehicle. The UAS can be for military and/or commercial applications or missions, such as missions to explore and map areas that are not accessible to humans or dangerous (e.g., a high threat area). The layered modules of the UAS can include attachable and detachable modules that may perform a wide variety of functions relevant to the mission of the UAS. For example, the layered modules of the UAS may include one or more functional components such as communication relay modules, armor, batteries, charging modules, propulsion modules, GPS modules, sensor modules, databases, processors, lights, explosive devices, electronic attack devices, payloads, audiovisual devices, flotation and/or buoyancy control devices, etc. The UAS may include multiple layered modules in which at least one of the layered modules performs one or more functions that are different than at least one other of the layered modules. In some embodiments, the layered modules of the UAS can be selected to provide functionality appropriate for the mission. For example, on a long-distance surveillance mission, the layered modules of the UAS can include batteries to provide sufficient power to travel long distances, sensors to capture surveillance data, processors to process the surveillance data, and databases to store the surveillance data. In some embodiments, the layered modules can be deployed at specific locations along a flight path of the UAS to perform location-dependent functionalities (e.g., surveillance of a target region). Deploying the layered modules reduces the weight of the UAS, which reduces power usage for the remainder of the flight path. The UAS may also pick up layered modules that have previously been deployed along the flight path.

In some embodiments, the layered modules include a primary functional module (referred to herein as a "primary module"). The primary module may provide initial structural integrity of the UAS and/or initial battery power to the UAS (e.g., the primary module may provide these functions when initially attached to the chassis of the UAS, but it may no longer provide these functions if deployed or separated from the chassis). The primary module can be attached to the UAS such that it at least partially surrounds the propellers of the UAS. This can allow the primary module to protect the propellers by absorbing physical impacts that would damage the UAS, resulting in delays or early terminations of the mission. The primary module can be any shape (e.g., a circular ring, a broken ring, a flat rectangle, a U-shape, etc.) needed to achieve a desired functionality. For example, if the functionality of the primary module includes preventing debris from falling through the propellers, the primary module may be an umbrella-shaped module above the propellers that deflects falling matter.

In some embodiments, the layered modules include one or more deployable functional modules (referred to herein as "deployable modules"). The deployable modules can be attached to the primary functional module and/or to each other via a suitable attachment arrangement, such as a latching mechanism. For example, the latching mechanism may be an electromagnetic latch that can be selectively activated to generate an electromagnetic field that holds two modules together. Attachment arrangements can be used to attach any number of deployable modules to the UAS. For example, a first deployable module may be attached to an underside of the primary module, a second deployable module may be attached to an underside of the first deployable module, a third deployable module may be attached to an underside of the second deployable module, and so on until all of the deployable modules are attached. Each deployable module may be selectively detached. For example, when the current of an electromagnetic latch is deactivated, the electromagnetic latch may disengage, allowing the modules to separate. In some embodiments, the deployable modules can be detached (i.e., deployed) in the reverse order, such that the last deployable module to be attached is the first deployable module to be detached.

In some embodiments, the deployable modules may be dropped at specific locations (referred to herein as "drop locations") and/or picked up at specific locations (referred to herein as "pickup locations") along a flight path of the UAS. The drop/pickup locations can be selected based on the functionality of each deployable module and the overall mission of the UAS. For example, if the mission is to gather surveillance data from a target region, the drop/pickup locations can be selected so that deployable modules which contain cameras are distributed throughout the target region. The flight path of the UAS can be optimized to choose an optimal route between the drop/pickup locations. In some embodiments, optimizing the flight path of the UAS can be based on optimizing power consumption of the UAS, maximizing a communication path length between the UAS and an origin station, minimizing or maximizing a travel path length between the drop/pickup locations, etc.

In some embodiments, the layered modules may have a layered architecture. As used herein, "layered" can refer to any form of layering, including, but not limited to, vertical stacking, concentric rings, concentric shells, or any combination thereof. In some embodiments, the deployable modules may be vertically stacked above or beneath the primary module. In some embodiments, the deployable modules may be concentrically arranged inside or outside of the primary module.

The versatile, multi-modular, and layered configuration of the UAS makes it particularly suited for performing simultaneous localization and mapping (SLAM), in which the UAS collects environmental data to construct a map of its environment while simultaneously keeping track of the position of the UAS within the environment. In some embodiments, the UAS can map an unknown environment by using one or more communication relay modules (located on the deployable modules) to extend its communication range into the unknown environment. For example, on an exploration mission of a subterranean tunnel, direct communications between the UAS and an external communication station (referred to herein as an "origin station") may not be possible due to the obstruction of signals by the ground. To overcome this, the UAS can deploy communication relay modules throughout the subterranean tunnel. The communication relay modules can transmit signals between the UAS and the origin station. The communication relay modules can also communicate between each other to extend the connection range of the UAS into subterranean areas that would otherwise be inaccessible to signals between the UAS and the origin station. The same concept could be extended or applied to additional environments, such as to the internal exploration of complex buildings with walls that could interfere with radio signals, and/or to the exploration of urban areas, possibly with foliage, that could interfere with radio signals.

In some embodiments, as the UAS deploys more communication relay modules, the resolution and accuracy of its SLAM functionality increases. Each deployed module can function as a "beacon" that transmits its location and gathers information about its surrounding environment. An increase in the number of communication relay modules deployed corresponds to an improvement in the quality of the SLAM data.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the above description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Multi-Module UAS

Figure 1A:
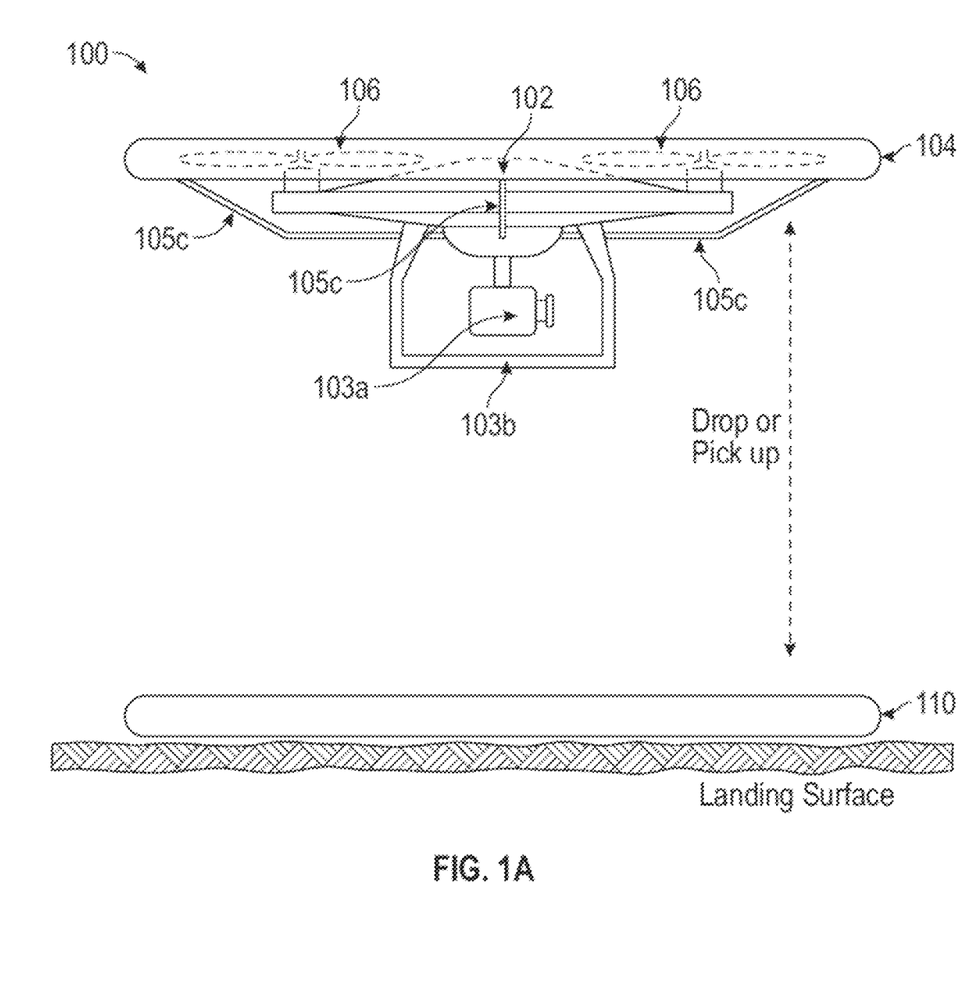
FIG. 1A illustrates a side view of an unmanned aerial system and a deployable layered module, according to certain embodiments.

FIG. 1A illustrates a side view of an exemplary UAS 100, according to certain embodiments. The UAS 100 can include any aerial vehicle. In the depicted example, the UAS 100 includes an unmanned aircraft (e.g., a drone) that is multi-modular—it can include multiple layered modules (e.g., primary module 104 and deployable module 110). One or more layered modules (e.g., the primary module 104) may be connected to a chassis 102 of the UAS 100 via a plurality of supports 105*c*. The UAS 100 may further include a sensor module 103*a*, a landing mechanism 103*b*, and propellers 106 mounted to the chassis 102.

In some embodiments, the chassis 102 can be a shell, housing, frame, internal frame, or other support structure that provides structural integrity to the UAS 100 and supports various components of the UAS 100. In some embodiments, the chassis 102 may be located centrally on the UAS 100 with other components extending radially from the chassis 102. For example, the propellers 106 may extend radially above the chassis 102, whereas the landing mechanism 103*b* may extend radially below the chassis 102. In some embodiments, the chassis 102 may house various internal components (not pictured in FIG. 1A) of the UAS 100, such as motors for the propellers 106, wiring, processors, batteries, etc.

In some embodiments, the sensor module 103*a* of the UAS 100 may include one or more sensors attached to the UAS 100. The sensor module 103*a* may enable precise navigation and environmental awareness of the UAS 100, enhancing its performance and reliability. The sensor module 103*a* can be positioned anywhere on the UAS 100. For example, as shown in FIG. 1A, the sensor module 103*a* may be attached to and underneath of the chassis 102. In some embodiments, the sensor module 103*a* may allow the UAS 100 to collect data, e.g., on its environment and its position relative to its environment. The sensor module 103*a* can include any portable sensor, such as a camera, a LiDAR sensor, a gyroscope, an accelerometer, a temperature sensor, an atmospheric pressure sensor, etc. In some embodiments, the chassis 102 can house a processor to process the data collected by the sensor module 103*a* and/or a database to store the data collected by the sensor module 103*a*.

In some embodiments, the landing mechanism 103*b* of the UAS 100 may include an undercarriage of the UAS 100 that supports the UAS 100 while on the ground for takeoff and/or landing. The landing mechanism 103*b* may absorb physical impacts associated with landing to protect the more delicate components of the chassis 102, the layered modules, the sensor module 103*a*, and the propellers 106 from the impacts. In some embodiments, the landing mechanism 103*b* can be positioned underneath of the chassis 102. In some embodiments, the landing mechanism 103*b* can be retractable, allowing for a streamlined aerial profile during flight and being deployed for landing.

In some embodiments, the propellers 106 of the UAS 100 may include a plurality of rotor blades and/or airfoils that rotate rapidly to generate lift and/or thrust. The propellers 106 may include multiple propeller units, each having a separate plurality of rotor blades, positioned at different locations on the chassis 102. One or more motors of the UAS 100 (not pictured in FIG. 1A) may control the rates at which the propeller units of the propellers 106 rotate. Depending on the position and rotation rate of each propeller unit, the roll, pitch, yaw, speed, etc. of the UAS 100 can be adjusted, allowing the UAS 100 to rotate, speed up, slow down, maneuver vertically, maneuver horizontally, maneuver sideways, etc. One or more of the propeller units of the propellers 106 may include a propeller guard (not pictured in FIG. 1A), which is a safety feature designed to encircle and shield the rotor blades from physical impacts. In some embodiments, a larger propeller guard may encircle some or all of the propeller units of the propellers 106 (e.g., a large ring that surrounds every propeller unit). In some embodiments, a smaller propeller guard may individually circle each propeller unit of the propellers 106 (e.g., a small ring that surrounds an individual propeller unit).

In some embodiments, the layered modules of the UAS 100 include a primary module 104 and at least one deployable module 110 which can be deployed from and/or picked up by the UAS 100. Different deployable modules 110 can have different functions. As such, the multi-module structure of the UAS 100 enables it to be reconfigured to perform different missions without requiring significant modifications to the structure of the UAS 100. For example, the deployable module 110 can be swapped out for a different module with a different functionality without major modifications to the other components of the UAS 100.

In some embodiments, the primary module 104 is a layered module that is aligned with the propellers 106 of the UAS 100 (i.e., the primary module 104 overlaps at least partially with the propellers 106 from a side view) to provide initial structural integrity to the UAS 100. This allows the primary module 104 to protect the propellers 106 by absorbing physical impact that would interfere with the blades of the propellers 106. For example, if the blades were to collide with a wall, the UAS 100 could explode or be severely damaged. The primary module 104 could mitigate the risk of severe damage to the UAS 100 by protecting the propellers 106 from external surfaces. The primary module 104 can also be configured to provide initial battery power to the UAS 100. In some embodiments, the primary module 104 may provide these functions when initially attached to the chassis 102 of the UAS 100, but, if deployed or separated from the chassis 102, it may stop providing these functions until it is reattached.

Although FIG. 1A shows the primary module 104 as being aligned with the propellers 106, it is to be understood that the primary module 104 can have any position relative to the propellers 106 to achieve a desired functionality. For example, if the functionality of the primary module 104 includes protecting the propellers 106 from the impact of flying into a ceiling, the primary module 104 may be positioned above the propellers 106. A plurality of supports 105*c* may extend from the chassis 102 to hold the primary module 104 in the desired position.

The primary module 104 may provide other additional functionalities for the UAS 100. In some embodiments, the primary module 104 can include a communication relay module to allow the UAS 100 to wirelessly communicate with external stations and/or devices. The communication relay module can include one or more electronic devices (e.g., transmitters, receivers, antennas, amplifiers, etc.) that are configured to transmit and receive signals for the UAS 100. The communication relay module can communicate with other communication relay modules to extend the connection range of the UAS 100. In some embodiments, the communication relay module can adapt its means of communication (e.g., changing from radio transmission to cellular transmission) based on environmental conditions. Furthermore, the communication relay module can adaptively adjust its communication parameters (e.g., frequency, power, signal type, network topology, and transmission rate) to optimize for the environmental conditions.

In some embodiments, the primary module 104 can include armor to provide additional physical protection to the UAS 100. The armor can include plating (e.g., lightweight composite plating on the chassis 102), reinforcement structures (e.g., metal rods around the supports 105*c*), protective guards (e.g., mud guards on the landing mechanism 103*b*), cushioning (e.g., impact-absorbing springs on the landing mechanisms 103*b*), etc.

In some embodiments, the primary module 104 can include a battery and/or battery pack to provide additional power reserves for the UAS 100 and extend its flight range. The battery may be rechargeable. In some embodiments, the primary module 104 can include one or more solar collectors (e.g., solar panels) that can charge batteries using solar power.

In some embodiments, the primary module 104 can include a charging module to provide the UAS 100 with a physical dock from which to receive battery charge. This can enable electronic devices (e.g., sensor module 103*a* of the UAS 100) to access the power reserves of any batteries on the primary module 104. For example, the charging module may be an inductive charging module on the surface of the primary module 104 that transfers power from a battery within the primary module 104 to an adjoining electronic device on the surface of the UAS 100. In some embodiments, the charging module can provide charge to the UAS 100 using solar power collected by the solar collectors.

In some embodiments, the primary module 104 can include a propulsion module to perform flight adjustments (e.g., changes to roll, pitch, yaw, speed, etc.) on the UAS 100. The propulsion module can include one or more propellers, motors, etc. located on the surface of the primary module 104 to provide additional maneuvering capabilities to the UAS 100. The propulsion module can also move the primary module 104 independently of the UAS 100 in situations in which the primary module 104 is detached from the UAS 100. By changing the rates at which the propellers rotate, the propulsion module can control the roll, pitch, yaw, speed, etc. of the primary module 104. In some embodiments, to increase or decrease its lifting capacity as required during the mission, the UAS may selectively pick up or drop propulsion modules, respectively. The UAS may also pick up or drop battery modules in order to provide sufficient power to the propulsion modules.

In some embodiments, the primary module 104 can include a GPS module to monitor the location of the UAS 100. The GPS module may include one or more wireless GPS trackers, receivers, etc. that can transmit and receive GPS signals.

In some embodiments, the primary module 104 can include a structure (e.g., a wind guard) to redirect airflow around the propellers 106 and ensure a smoother flight of the UAS 100.

In some embodiments, the primary module 104 can include a sensor module to allow the UAS 100 to collect data, e.g., on its environment and its position relative to its environment. The sensor module can include any portable sensor, such as a camera, a LiDAR sensor, a gyroscope, an accelerometer, a temperature sensor, an atmospheric pressure sensor, etc. In some embodiments, the primary module 104 can include a processor to process data (e.g., data collected by the sensor module) and/or a database to store data.

In some embodiments, the primary module 104 can include a light to selectively illuminate the environment of the UAS 100. The light can include a headlight, an infrared light, a laser, etc.

In some embodiments, the primary module 104 can include an explosive device to be deployed by the UAS 100. The explosive device can include explosive ordnance, munitions, detonation charges, incendiary devices, bombs, improvised explosive devices (IEDs), etc.

In some embodiments, the primary module 104 can include an electronic attack device to be deployed by the UAS 100. The electronic attack device can include an electromagnetic pulse (EMP) generator, a storage device containing malware, a signal jammer, a false radar signal generator, etc.

In some embodiments, the primary module 104 can include a storage compartment to carry any given payload (e.g., environmental samples collected during flight, equipment to be delivered to or picked up from a drop/pickup location, etc.). The storage compartment may be an enclosed compartment within the primary module 104. In some embodiments, the enclosed compartment may be airtight and/or watertight.

In some embodiments, the primary module 104 can include an audiovisual device for local recording and/or radio transmission to a viewing/listening location. The audiovisual device can be a camera, microphone, and/or recorder. The audiovisual device can be configured to store, display, and/or transmit images and/or sounds.

In some embodiments, the primary module 104 can include a flotation device to provide and/or control buoyancy for the UAS 100 in aquatic environments.

It is to be understood that the functionalities of the primary module 104 can include but are not limited to the listing above. In some embodiments, other layered modules (e.g., the deployable module 110) may also have the same or similar functionalities as the primary module 104. In some embodiments, other layered modules may supplement the functionalities of the primary module 104.

In some embodiments, a layered module (e.g., the primary module 104) can transmit instructions from the main body of the UAS 100 (e.g., the portion connected to the propellers 106) to any of its outlying layered modules (e.g., the deployable module 110). Notably, the layered modules do not necessarily follow a swarm configuration-instead, they can follow a control hierarchy configuration in which the instructions of one module and/or component can supersede control of other modules. In some embodiments, in the control hierarchy of the UAS 100, the primary module 104 can be thought of as the primary controller among the layered modules, and the deployable module 110 can be controlled by the primary module 104. For example, at the start of the mission, each deployable module 110 may be pre-programmed with a given set of tasks. During the mission, depending on the evolving needs of the mission, the set of tasks may change in real-time. The primary module 104 may transmit instructions to reprogram each deployable module 110, updating the set of tasks to supersede what was pre-programmed at the start of the mission.

Although FIG. 1A shows the UAS 100 as being an aerial vehicle, it is to be understood that the UAS 100 may also be a different vehicle type. In some embodiments, the UAS 100 may be one or more of a land-based vehicle (e.g., autonomous rover), an aquatic vehicle (e.g., autonomous boat), a submersible vehicle (e.g., autonomous submarine), and an amphibious vehicle. The vehicle type of the UAS 100 may be chosen based on the mission constraints. In some embodiments, the UAS 100 may be one of a plurality of vehicles used to carry out a mission. The plurality of vehicles may include vehicles of either the same vehicle type or of different vehicle types, depending on the mission.

Figure 1B:
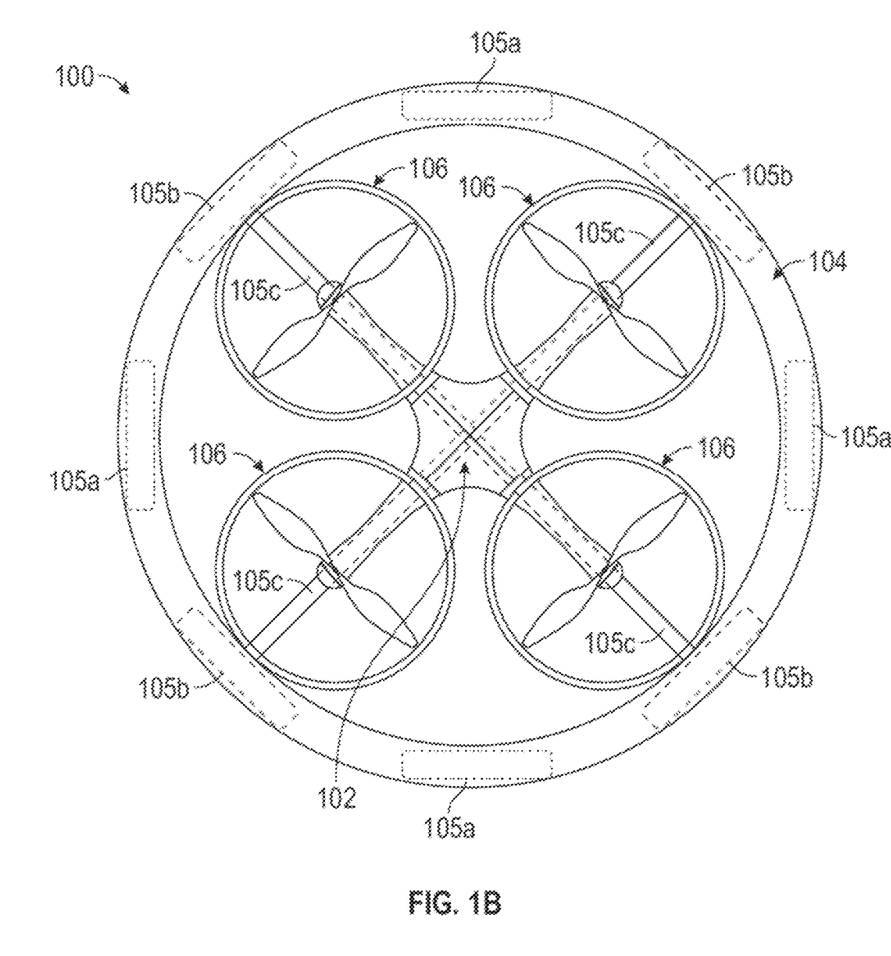
FIG. 1B illustrates an overhead view of an unmanned aerial system and a primary module, according to certain embodiments.

FIG. 1B illustrates an overhead view of the exemplary UAS 100, according to certain embodiments. In the depicted example, an exemplary primary module 104 of the UAS 100 is illustrated in detail as including one or more batteries 105a and one or more functional components 105b (e.g., components which can perform the functionalities of the primary module 104, as described in the listing above).

As shown in FIG. 1B, the primary module 104 is elevated above the chassis 102 of the UAS 100 by several supports 105c, such that the primary module 104 is level with the propellers 106 of the UAS 100. The supports 105c can extend from the chassis 102 toward the primary module 104. For example, the supports 105c can extend beneath and beyond the propellers 106 to connect to the inner circumference of the primary module 104. In some embodiments, the supports 105c may be evenly spaced such that the forces on the primary module 104 are evenly distributed.

Although FIG. 1B shows the primary module 104 as a circular ring-shaped module that encircles the propellers 106 of the UAS 100, it is to be understood that the primary module 104 can be any shape (e.g., a broken ring, a flat rectangle, a U-shape, etc.) needed to achieve a desired functionality. For example, if the functionality of the primary module 104 includes preventing debris (e.g., during sub-surface operations) from falling through the propellers 106, the primary module 104 may be an umbrella-shaped module above the propellers 106 that deflects falling matter. Furthermore, although FIG. 1B shows the propellers 106 as including four propellers that are level with each other, it is to be understood that the propellers 106 can include any number of propellers in any number of configurations.

Referring back to FIG. 1A, the UAS 100 can include one or more deployable modules which provide one or more functionalities to the UAS 100. In some embodiments, the UAS 100 can include a single deployable module 110 (e.g., deployable module 110) in addition to the primary module 104. The deployable module 110 can include a communication relay module to allow the UAS 100 to wirelessly communicate with external stations and/or devices, armor to provide additional physical protection to the UAS 100, a battery and/or battery pack to provide additional power reserves for the UAS 100 and extend its flight range, a charging module to provide the UAS 100 with a physical dock from which to receive battery charge, a propulsion module to perform flight adjustments on the UAS 100, a GPS module to monitor the location of the deployable module 110, a structure to redirect airflow around the propellers 106 and ensure a smoother flight of the UAS 100, a sensor module (e.g., LiDAR) to allow the UAS 100 to collect data on its environment, a processor to process data, a database to store data, a light (e.g., a headlight) to selectively illuminate the environment of the UAS 100, an explosive device to be dropped by the UAS 100, an electronic attack device to be deployed by the UAS 100, a storage compartment to carry any given payload (e.g., environmental samples collected during flight, equipment to be delivered to or picked up from a drop/pickup location, etc.), an audiovisual device for local recording and/or radio transmission to a listening location, and a flotation device to provide and/or control buoyancy for the UAS 100 in aquatic environments. The functionalities of the deployable module 110 can include any combination of functionalities of the primary module 104 as listed above. It is to be understood that the functionalities of the deployable module 110 can include but are not limited to the listing above. In some embodiments, other layered modules (e.g., the primary module 104) may also have the same or similar functionalities as the deployable module 110. In some embodiments, other layered modules may supplement the functionalities of the deployable module 110.

As shown in FIG. 1A, the deployable module 110 is a layered module that can attach to and detach from the primary module 104. This allows for functional components of the UAS 100 to be added or removed as needed. For example, the deployable module 110 can carry an additional battery pack to provide the UAS 100 with additional power reserves, allowing the UAS 100 to fly for a greater duration and/or distance. Optionally, once the battery pack is depleted, the deployable module 110 can be dropped, reducing the overall weight of the UAS 100 and further extending its flight range.

According to some embodiments, the deployable module 110 can be deployed (e.g., dropped) from the UAS 100 during flight and land on a surface beneath the flight path. As used herein, "during flight" can refer to periods during which the UAS 100 is following a flight path on a mission. The propellers 106 may be rotating to keep the UAS 100 in the air. The UAS 100 can perform flight adjustments (e.g., changing the rates at which each of its propellers 106 rotates to control the roll, pitch, yaw, speed, etc. of the UAS 100) to ensure that the deployable module 110 lands at a specific location on the surface and to adjust its flight control to retain altitude when the weight of 110 drops off. For example, the deployable module 110 can carry ammunitions (e.g., an explosive device). Once the UAS 100 reaches a specific location along its flight path, the deployable module 110 can be dropped to land on a target at the corresponding location on the surface.

In some embodiments, once deployed, a deployable module 110 can be attached (e.g., picked up) by the same UAS 100 that initially deployed the deployable module 110, or by a different UAS. For example, if the UAS 100 were on a surveillance mission, the deployable module 110 could carry sensors for collecting data, processors for processing data, and databases for storing the data. The deployable module 110 could be dropped at a specific location and left at the specific location to discreetly collect information (e.g., audio recordings) over several weeks. At the conclusion of the surveillance mission, the UAS 100 could be sent to retrieve the deployable module 110 and/or the data stored on the deployable module 110. Alternatively, a different UAS could be sent to retrieve the deployable module 110 if the UAS 100 were to be unavailable at the retrieval time.

Although FIG. 1A shows the primary module 104 as being kept attached to the UAS 100 and the deployable module 110 as being deployed from the UAS 100, it is to be understood that any of the modules can be deployed, including the primary module 104, and any of the modules can be kept attached, including the deployable module 110. For example, the deployable module 110 may be kept attached to the UAS 100 (i.e., does not get deployed) throughout the duration of a mission. Instead, the deployable module 110 may be switched out after the mission to allow the UAS 100 to perform a different functionality. For example, in an aquatic mission, the deployable module 110 may carry flotation and/or buoyancy control devices that keep the UAS 100 at the surface of the aquatic environment. Because the flotation and/or buoyancy control devices are needed throughout the duration of the aquatic mission, the deployable module 110 is kept attached to the UAS 100. After the aquatic mission is completed, the flotation and/or buoyancy control devices are no longer needed, and thus, the deployable module 110 can be detached from the UAS 100. If the next mission were to be a surveillance mission, the deployable module 110 could be switched out for a different deployable module that carries sensors instead of flotation and/or buoyancy control devices.

Although FIG. 1A shows the deployable module 110 as being attached directly to the primary module 104, it is to be understood that the deployable module 110 may instead be attached to a different portion of the UAS 100, such as the chassis 102. In some embodiments, the deployable module 110 may be attached to another deployable module (see FIGS. 2A-2B), the chassis 102 of the UAS 100 (see FIG. 4), and/or another component of the UAS 100.

Although FIG. 1A shows the deployable module 110 as being a single deployable module, it is to be understood that the deployable module 110 may also include multiple deployable modules. For example, FIGS. 2A and 2B illustrate an exemplary UAS having multiple deployable modules 210, as described below in greater detail.

Figure 2A:
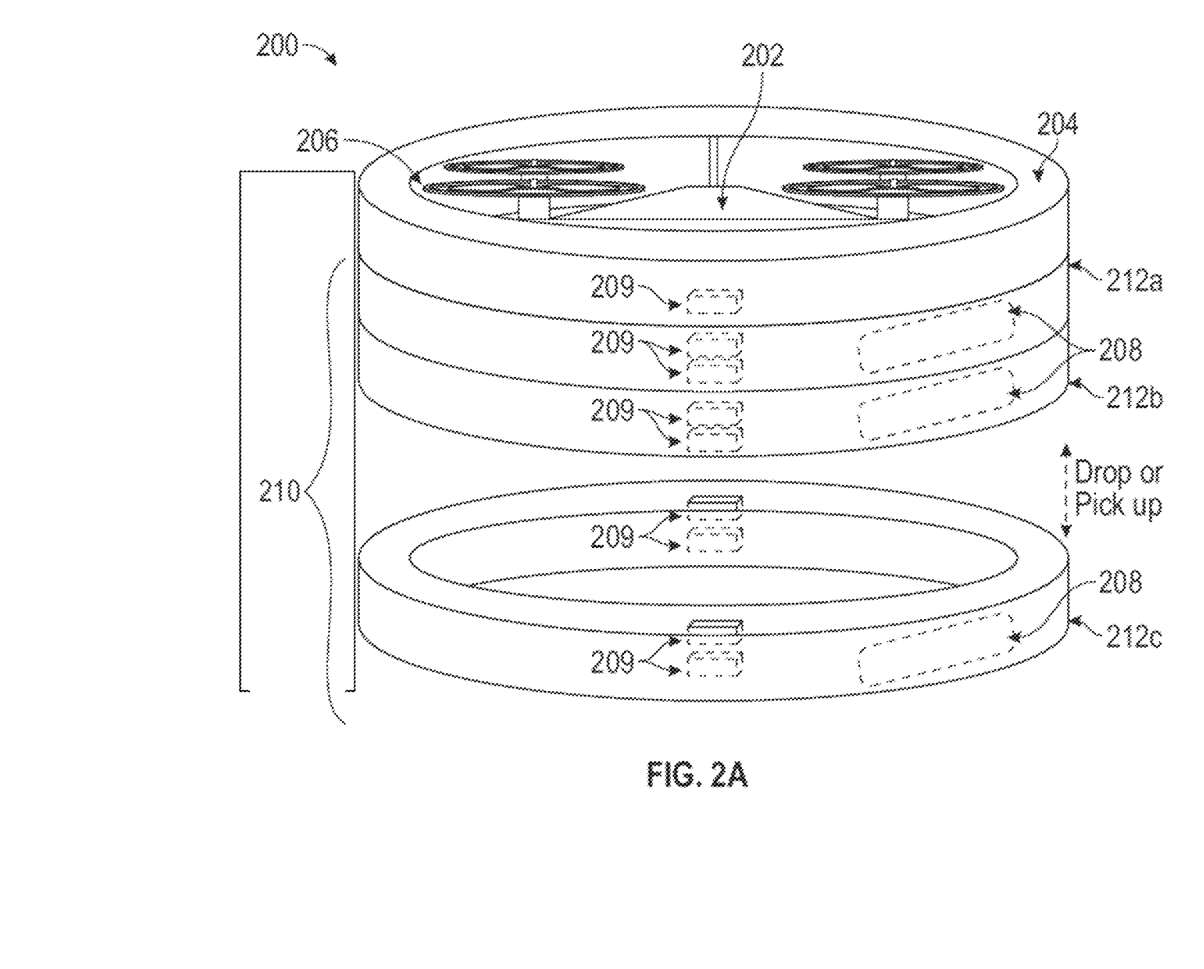
FIG. 2A illustrates an isometric view of an unmanned aerial system in which the deployable modules are stacked vertically, according to certain embodiments.
Figure 2B:
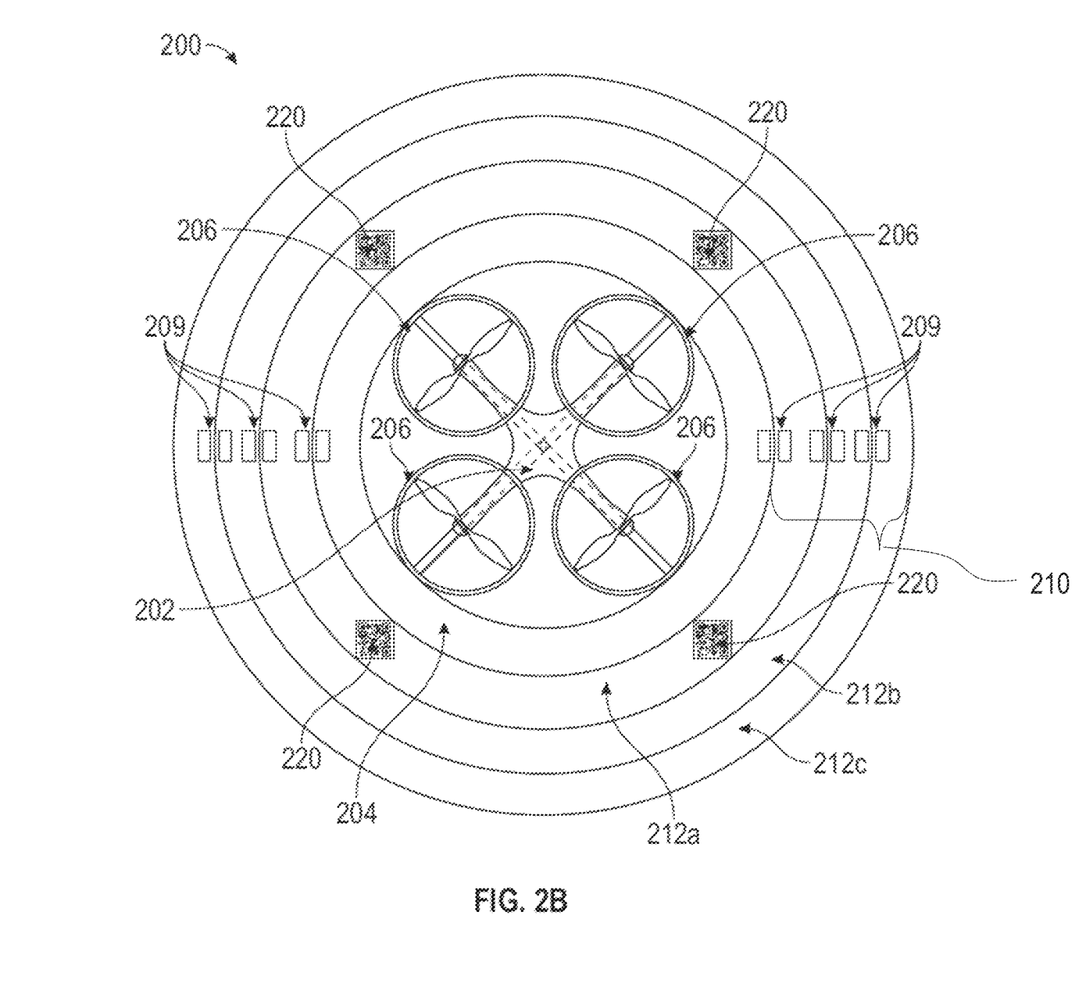
FIG. 2B illustrates an overhead view of an unmanned aerial system in which the deployable modules are arranged concentrically, according to certain embodiments.

FIG. 2A illustrates an exemplary UAS 200 in which multiple deployable modules 210 are stacked vertically, according to certain embodiments. Specifically, the deployable modules 210 are configured to attach to each other via latching mechanisms 209 such that each module is stacked vertically above and/or below another module. As shown, deployable modules 210 include a first deployable module 212a, a second deployable module 212b, and a third deployable module 212c. The first deployable module 212a is the top-most of the deployable modules 210 and is configured to attach to and detach from a surface (e.g., the bottom side) of the primary module 204. The second deployable module 212b is configured to attach to and detach from the underside of the first deployable module 212a. The third deployable module 212c is configured to attach to and detach from the underside of the second deployable module 212b. In some embodiments, the deployable modules 210 can be detached (i.e., deployed) in the reverse order, such that the last deployable module to be attached (e.g., third deployable module 212c) is the first deployable module to be detached. In some embodiments, the bottom-most deployable module may be configured to attach to and detach from a surface (e.g., the top side) of the primary module 204.

In some embodiments, the latching mechanisms 209 include one or more regions of the primary module 204 and/or the deployable modules 210 that are configured to align with each other and hold the various modules together. The latching mechanisms 209 can include a latch, fastener, connector, or other connective device. In some embodiments, the latching mechanisms 209 may be an electromagnetic or electromechanical mechanism. For example, the latching mechanism may be an electromagnetic latch that can be selectively activated to generate an electromagnetic field that holds two modules together. When the electrical current is on for a given electromagnetic latching mechanism 209, two adjoining modules (e.g., first deployable module 212a and second deployable module 212b) may be held together. In some embodiments, the electromagnetic latching mechanism 209 can be selectively deactivated such that the electromagnetic field no longer holds the two modules together (i.e., the deployable modules 210 may be selectively detached). When the electrical current is off, the two adjoining modules may be separated (e.g., second deployable module 212b drops away from the first deployable module 212a). In some embodiments, the latching mechanism 209 may not include a physical latch but may instead include electromagnetic coils that contactlessly hold the modules in place relative to one another.

In some embodiments, the latching mechanisms 209 include one or more regions of the primary module 204 and/or the supports (not visible; see supports 105c of FIG. 1A for example) that are configured to align with each other and hold the primary module 204 onto the UAS 200. When the electrical current is on for a given electromagnetic latching mechanism 209, the primary module 204 may be held together with the supports. In some embodiments, the electromagnetic latching mechanism 209 can be selectively deactivated such that the electromagnetic field no longer holds the primary module 204 and the supports together (i.e., the primary module 204 may be selectively detached). When the electrical current is off, the primary module 204 may drop away from the supports.

In some embodiments, the latching mechanisms 209 can include alternative connection mechanisms. In an example, opposing annular patterns may be inscribed on adjoining surfaces of adjoining modules (e.g., a primary module 204 and a first deployable module 212a). One surface may include a protruding pattern (e.g., spiral extrusions), and the corresponding surface may include a recessed pattern (e.g., spiral grooves). This can help to align the mating of adjoining modules and can provide structural rigidity after the modules are joined. In some embodiments, the adjoining modules can screw together and be held in place by the patterns alone. In another example, the latching mechanisms 209 can include non-powered magnets that are configured to align with each other and hold the various modules together. A temporary electro-magnetic pulse may be applied to one or more of the non-powered magnets to push them apart. In another example, the latching mechanisms 209 can include burnable links that are configured to catch on fire under certain circumstances (e.g., when controlled by the operator of the UAS 200). Upon catching on fire, the burnable links can disintegrate, allowing one or more modules to drop apart from one another. The surrounding structures of the UAS 200 may be fire-resistant so as to avoid damage from the burnable links. Conversely, in some embodiments, the surrounding structures of the UAS 200 may include inactive functional components that are activated by fire (e.g., explosive/incendiary devices that catch on fire along with the burnable links, such that once the burnable links disintegrate, the device drops onto and damages a target structure). In some embodiments, the burnable links may be connected to a time-delay fuse that sets the burnable links on fire after a set duration of time.

In some embodiments, the UAS 200 can include any number of power (e.g., electrical) and/or signal (e.g., data transfer) connections between the layered modules (e.g., between primary module 204 and the deployable modules 210, and/or between different modules of the deployable modules 210). In some embodiments, the power and/or signal connections between the layered modules may be severed when the modules are detached and reconnected when the modules are reattached. The power connections can exchange electrical charge between modules when they are connected. Conversely, in some embodiments, the signal connections between the layered modules may be wireless such that the modules do not need to be connected in order for signals to be exchanged between modules.

In some embodiments, to facilitate modularity (e.g., deployable modules can be swapped out for each other), each module of the deployable modules 210 can have approximately the same form factor as the other modules. However, the mass, functionality, and order of the deployable modules 210 can differ depending on which functional components 208 are installed on each module. To fulfill mission objectives, different deployable modules 210 may be required to perform different functions. For example, the functional components 208 of the first deployable module 212a may include a flotation device, whereas the functional components 208 of the second deployable module 212b may include a battery pack. The functional components 208 of the deployable modules 210 may include any of the components described above with reference to the deployable module 110 of FIG. 1A (e.g., communication relay module, armor, battery, charging module, propulsion module, GPS module, sensor module, processor, database, light, explosive device, electronic attack device, payload, audiovisual device, flotation and/or buoyancy control device, etc.).

Although FIG. 2A shows the deployable modules 210 as being stacked vertically beneath the primary module 204 and surrounding the chassis 202, it is to be understood that the deployable modules 210 can be arranged in any configuration relative to the primary module 204. For example, the first deployable module 212a may instead be configured to attach to and detach from the top of the primary module 204. One or more deployable modules 210 may be stacked above and/or beneath the primary module 204 (i.e., the stacks of deployable modules 210 may extend above the propellers 206 as well as below). In some embodiments, the UAS 200 may be maneuvered mid-flight to enable dropping or picking up deployable modules 210 that are stacked vertically above the primary module 204. For example, the UAS 200 may turn upside-down to drop the deployable modules 210, then turn rightside-up to continue along the flight path. Furthermore, vertical stacking is not the only configuration available for the deployable modules 210 of the UAS 200-concentric arrangement is another viable configuration that is described below in FIG. 2B.

FIG. 2B illustrates an exemplary UAS 200 in which multiple deployable modules 210 are arranged concentrically, according to certain embodiments. Specifically, the deployable modules 210 are configured to attach to each other via latching mechanisms 209 such that each module is arranged concentrically inside and/or outside of another module. As shown, first deployable module 212a is the inner-most of the deployable modules 210 and is configured to concentrically attach to and detach from a surface (e.g., the outside) of the primary module 204. In other words, the diameter of the first deployable module 212a is larger than the diameter of the primary module 204 such that the modules can adjoin concentrically. The second deployable module 212b is configured to attach to and detach from the outside of the first deployable module 212a, and its diameter is larger than the diameter of the first deployable module 212a. The third deployable module 212c is configured to attach to and detach from the underside of the second deployable module 212b, and its diameter is larger than the diameter of the second deployable module 212b. In some embodiments, the outer-most of the deployable modules 210 may be configured to concentrically attach to and detach from a surface (e.g., the inside) of the primary module 204.

Accordingly, due to needing different diameters to achieve the concentric arrangement configuration, the deployable modules 210 of FIG. 2B do not have similar form factors. In some embodiments, a given deployable module 210 may not be configured to swap out freely with every other deployable module (e.g., module 212b cannot directly replace module 212a due to the difference in size). However, advantages of the concentric arrangement configuration over the vertical stacking configuration are the more aerodynamic profile of the UAS 200 (when flying horizontally to the surface) and the ability to provide additional armor modules around the propellers 206. In some embodiments, the deployable modules 210 of FIG. 2B may be deployed in an ordered sequence to account for the concentric configuration.

In some embodiments, the mass, functionality, and order of the deployable modules 210 can differ depending on which functional components 208 are installed on each module. To fulfill mission objectives, different deployable modules 210 may be required to perform different functions. For example, the functional components 208 of the first deployable module 212a may include a flotation device, whereas the functional components 208 of the second deployable module 212b may include a battery pack.

In some embodiments, the UAS 200 may be configured to detect an orientation of one or more of the deployable modules 210 once deployed. For example, a deployable module 212a of the deployable modules 210 may comprise one or more visual codes 220 (e.g., a QR code) that are orientation-dependent (e.g., will look different when viewed from different angles). The UAS 200 may include a camera configured to detect the visual codes 220. If the deployable module 212a were dropped during flight of the UAS 200, the camera could detect an orientation and/or position of the deployable module 212a based on the visual codes 220. In some embodiments, the UAS 200 may be configured to detect an identity of one or more of the deployable modules 210 using the visual codes 220. For example, the deployable module 212a may have a unique set of visual codes 220. The UAS 200 may recognize the visual codes 220 as belonging to the specific deployable module 212a (e.g., by comparing the visual codes 220 to a database of all visual codes and their corresponding deployable module).

Methods for Operating a Multi-Module UAS

Figure 3:
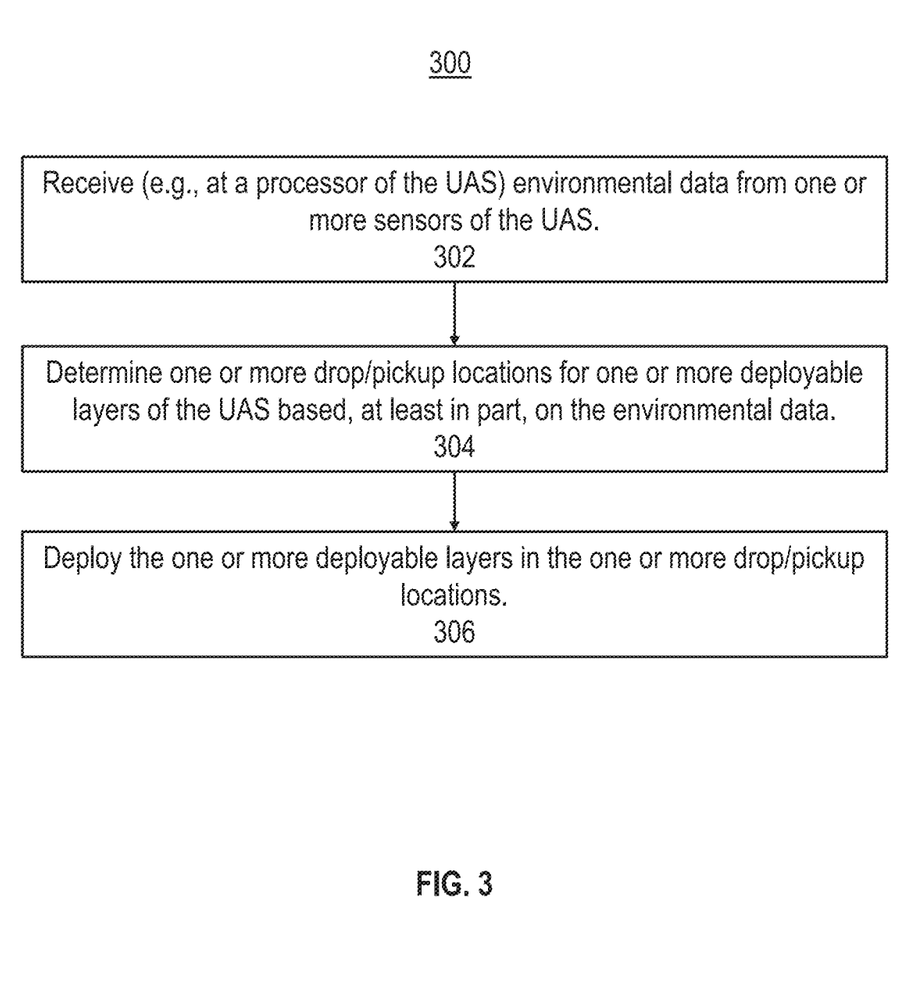
FIG. 3 illustrates a process flowchart for operating an unmanned aerial system, according to certain embodiments.

FIG. 3 illustrates a flowchart on an exemplary method 300 for operating an UAS, according to certain embodiments. In some embodiments, the method 300 may allow the UAS to perform simultaneous localization and mapping (SLAM), in which the UAS collects environmental data to construct a map of its environment while simultaneously keeping track of the UAS' position within the environment. The method 300 may involve using one or more sensors of the UAS (e.g., temperature sensors, atmospheric pressure sensors, LiDAR sensors, cameras, etc.) to collect environmental data. The method 300 may further involve using one or more processors of the UAS to process the environmental data, one or more databases of the UAS to store the environmental data, one or more wireless GPS trackers to keep track of the UAS' position, and one or more communication relay modules to transmit information from the UAS to an external station (e.g., an origin station). The combination of sensors, processors, database, GPS trackers, and/or communication relay modules enables the UAS to perform telemetry. The method 300 may be performed using any UAS described herein, such as UAS 100 of FIG. 1A-1B or UAS 200 of FIGS. 2A-2B.

In some embodiments, method 300 may be used for military and/or commercial applications or missions, such as missions to explore and map areas that are not accessible to humans or dangerous (e.g., a high threat area). High threat areas may include any number of hazardous environments, such as regions prone to natural disasters (earthquake, avalanche, flooding, mudslide, etc.), oxygen-poor environments, low-visibility environments, war zones, subterranean regions, etc.

At step 302, the UAS receives environmental data from one or more sensors of the UAS. The environmental data may include data about one or more factors related to the environment of the UAS, such as terrain (soil composition, rock type, topography, slope, surface structures both natural and man-made, vegetation, water features, hazards, etc.), atmospheric conditions (precipitation, turbulence, temperature, air pressure, humidity, wind speed, light level, etc.), altitude, and GPS location. The sensors may include any portable sensor, such as a camera, a LiDAR sensor, a gyroscope, an accelerometer, a temperature sensor, an atmospheric pressure sensor, etc. The UAS can include any features of UAS 100 of FIG. 1A-1B or UAS 200 of FIGS. 2A-2B.

At step 304, the UAS determines one or more drop/pickup locations for one or more deployable modules (e.g., deployable module 110 of FIG. 1A-1B or deployable modules 210 of FIGS. 2A-2B) of the UAS. This determination is based, at least in part, on the environmental data obtained at step 302. The deployable modules are configured to be programmed based, at least in part, on the environmental data. Programming the deployable modules may include setting one or more of frequency, power, signal type, network topology, and transmission rate of the deployable modules to account for environmental factors such as terrain, atmospheric conditions, altitude, GPS location, etc. For example, in an environment with heavy rainfall, signals emitted at microwave radio frequencies may experience degradation due to rain fade. To compensate for the rain fade effect, a transmission power of the signals emitted by the deployable modules can be increased.

In some embodiments, determining the one or more drop/pickup locations for the one or more deployable modules is further based on a predictive model. The predictive model may be a machine-learning algorithm configured to generate a path of the UAS based on the environmental data.

At step 306, the UAS deploys the one or more deployable modules in the one or more drop/pickup locations. After being deployed, the deployable modules, which were formerly attached to the UAS, may become "deployed modules" that are not attached to the UAS. Subsequently, a retrieval UAS, which may be either the same UAS that deployed the modules or a different UAS may return to retrieve the deployed modules. The retrieval UAS may receive location data associated with the deployed modules (e.g., via a GPS module onboard one or more of the deployed modules), maneuver the UAS to one or more pickup locations based on the location data; and pick up the deployed modules. Upon being picked up via the UAS, the deployed modules may once again become part of the deployable modules.

In some embodiments, prior to performing the method 300, the UAS may perform some preliminary operations. For example, the UAS may be configured to perform a preliminary systems scan to confirm that the components of the UAS that are required to perform the method 300 are functional, and/or to conduct a preliminary environmental scan to confirm that the immediate surroundings of the UAS are suitable for performing the method 300. In some embodiments, the sensors of the UAS may detect a condition of the UAS and/or its surroundings, then the UAS may autonomously perform an action based on the sensors (e.g., upon detecting that the UAS is too heavy, deploying a module to reduce weight before performing the method 300). In some embodiments, the UAS may alert an operator of the need to perform an action, and the operator may decide whether to perform the action.

In some embodiments, after performing the method 300, the UAS may perform some additional operations. For example, the UAS may be configured to perform a post-deployment scan to determine if the deployable modules have been successfully dropped or picked up (e.g., whether a module is at the correct drop/pickup location, whether the module is in full functioning condition, and/or whether there are any environmental hazards that may displace or damage the module). In some embodiments, after performing the method 300, the UAS may repeat the method 300 and/or any of its associated preliminary operations and additional operations.

Figure 4:
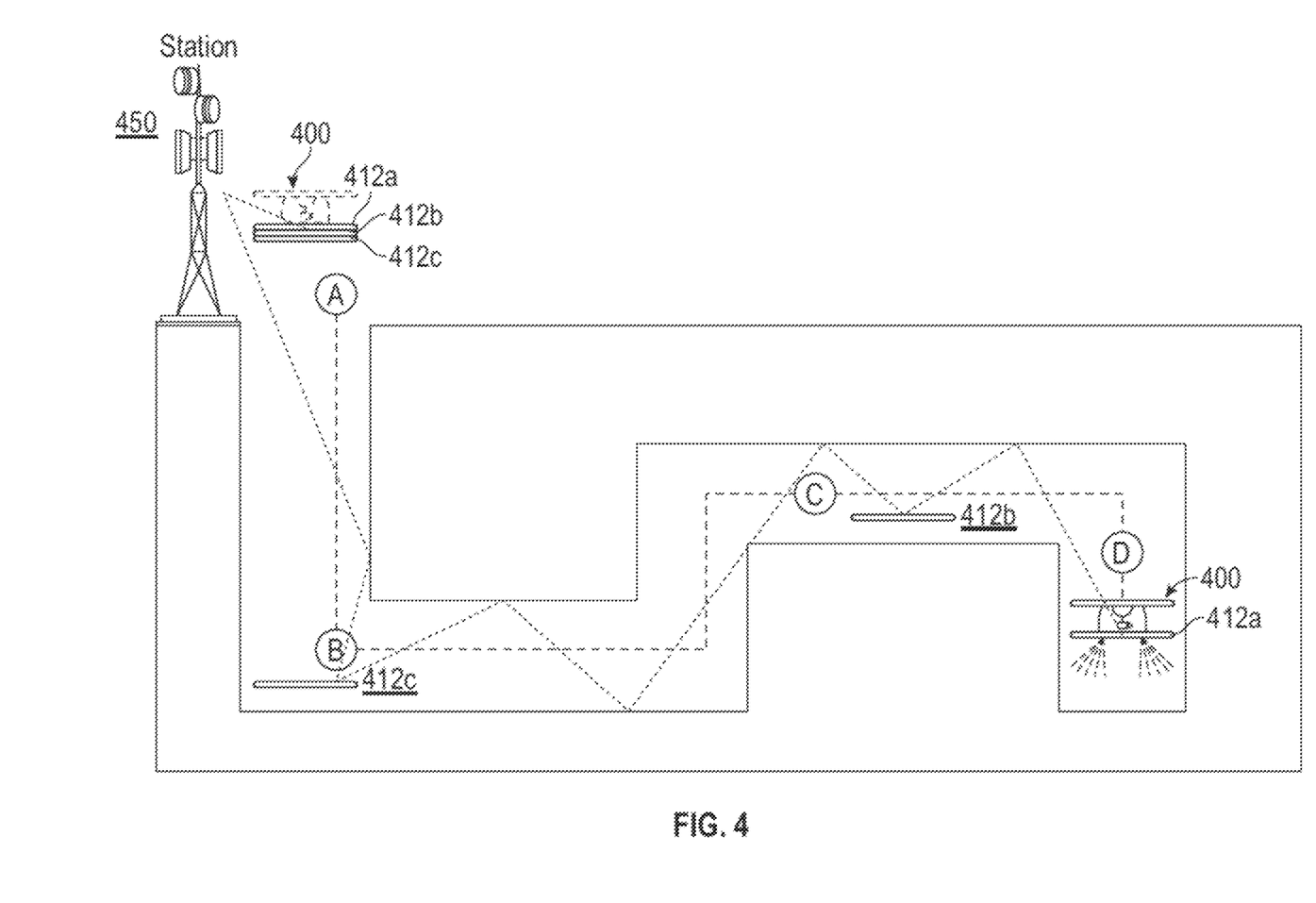
FIG. 4 illustrates a method of deploying communication relay modules in a sub-surface environment using an unmanned aerial system, according to certain embodiments.

The simultaneous localization and mapping functionality of the UAS enables it to perform various missions in unknown environments, such as exploration missions in subterranean environments. FIG. 4 illustrates an exemplary process of using a UAS 400 to deploy communication relay modules in a subterranean environment, according to certain embodiments. The UAS 400 includes several deployable modules (e.g., 412a, 412b, and 412c), and each deployable module includes one or more communication relay modules, which may be one or more electronic devices (e.g., transmitters, receivers, antennas, amplifiers, etc.) that are configured to transmit signals between the UAS 400, a different deployable module, and/or an origin station 450. The communication relay modules can communicate between each other to extend the connection range of the UAS 400 and the origin station 450 and to establish optimal communication parameters. For example, by deploying the communication relay modules at various locations throughout the subterranean environment, the UAS 400 can extend its communication range into subsurface areas that would otherwise be inaccessible to signals between the UAS 400 and an origin station 450. Note that in the example shown in FIG. 4, the deployable module 412a is attached to the chassis of the UAS 400 and not to the primary module. It is to be understood that the deployable modules 412a could instead be attached to a different portion of the UAS 400. In some embodiments, the deployable module 412a could be attached to another deployable module, the primary module, and/or another component of the UAS 400.

In some embodiments, the UAS 400 may travel along a flight path from location A to location B to location C to location D. The UAS 400 may use a combination of environmental data obtained from onboard sensors (e.g., LiDAR) and data provided by the origin station 450 (e.g., location data) to determine an appropriate flight path and its position along the flight path. For example, the UAS 400 may use LiDAR to determine where obstacles in a subterranean environment are located and select a flight path that navigates around the obstacles.

At an origin location A of the flight path, the UAS 400 may be in the proximity of the origin station 450 and may be near or above the surface. Recalling that the term "UAS" can refer to a system that contains both an unmanned aircraft and a corresponding ground control station (e.g., a station that provides human and/or computer-based control for the unmanned aircraft), the origin station 450 may refer to a ground control station of the UAS 400. Alternatively, the origin station 450 may be a different station that does not provide aircraft control instructions. For example, the origin station 450 may be a cell tower that exchanges location data with the aircraft of the UAS 400 (e.g., to allow the aircraft to determine its location), but it may not control the aircraft, nor may it receive mission data from the aircraft. At location A, the UAS 400 may communicate directly with the origin station 450 without relying on any deployed communication relay modules. Instead, the UAS 400 may carry deployable modules 412a, 412b, and 412c, each containing a communication relay module, to be deployed further into the subterranean environment.

At location B of the flight path, the UAS 400 has travelled deeper into the subterranean environment. The UAS 400 may deploy one of the communication relay modules (e.g., the module aboard deployable module 412c) to extend its communication range and allow it to maintain communication with the origin station 450. The UAS 400 may continue to carry the remaining communication relay modules aboard deployable modules 412b and 412a as it advances along the flight path. Further along the flight path, at location C, the UAS 400 may deploy the communication relay module aboard deployable module 412b to further extend its communication range. At location D of the flight path, the UAS 400 may be scanning for a suitable drop location to deploy the communication relay module aboard deployable module 412a. The drop location may be a location which enables the communication relay module to maintain communication with one or more of the previously deployed communication relay modules (e.g., at locations B and C) and the origin station 450.

The flight path of the UAS 400 may be optimized to choose an optimal route between the origin location (e.g., location A) and the drop locations (e.g., locations B, C, and D). In some embodiments, optimizing the flight path of the UAS 400 may be based on optimizing power consumption of the UAS 400. In some embodiments, optimizing the path of the UAS may be based on maximizing a communication path length between the UAS and an origin station. In some embodiments, optimizing the path of the UAS may be based on minimizing or maximizing a travel path length between the UAS and an origin station.

In some embodiments, the UAS 400 may detect that it is nearing or has exceeded the limits of its communication range (i.e., losing communication with the origin station 450) and may backtrack along its flight path (e.g., toward the drop location of the previous communication relay module) to return to the communication range. After backtracking, the UAS 400 may deploy a communication relay module along the flight path to extend the communication range. In some embodiments, the UAS 400 may pick up and re-deploy a previously deployed communication relay module to adjust the communication range. In some embodiments, the UAS 400 may search for an alternative flight path along which to deploy a communication relay module. When the UAS 400 is no longer able to deploy additional communication relay modules, the UAS 400 may provide feedback to an operator that it has reached the maximum extent of its communication range.

Figure 5:
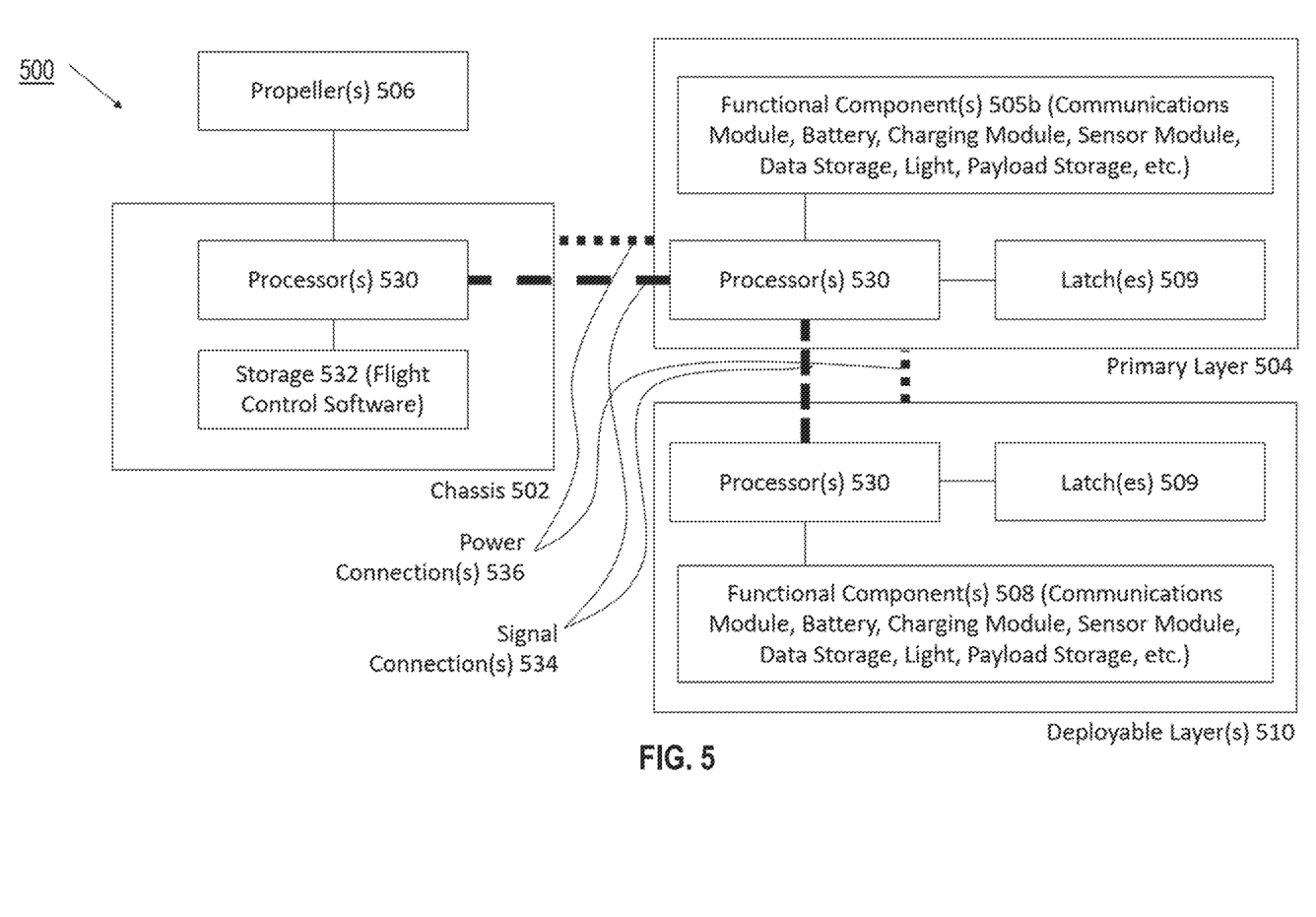
FIG. 5 illustrates a block diagram of an exemplary unmanned aerial system, according to certain embodiments.

Deploying and picking up communication relay modules requires the UAS to perform real-time flight adjustments to account for how changes in weight affect the flight path of the UAS. FIG. 5 illustrates a block diagram of an exemplary UAS 500 having flight adjustment abilities, according to certain embodiments. The UAS 500 can include any features of UAS 100 of FIGS. 1A-1B, UAS 200 of FIGS. 2A-2B, the UAS of FIG. 3, and/or UAS 400 of FIG. 4. The UAS 500 is configured to perform flight adjustments to compensate for adding or dropping deployable layers during flight. In the depicted example, the UAS 500 can include one or more processor(s) 530 that are configured to receive data from and/or transmit instructions to connected components (e.g., propeller(s) 506) in order to perform the flight adjustments.

In some embodiments, the chassis 502 of the UAS 500 may contain processor(s) 530 that are communicatively connected to storage 532, which stores flight control software for calculating the required flight adjustments. The flight control software may automatically compensate for changes in weight due to adding or dropping the deployable layers. For example, battery modules (e.g., deployable modules 210 of FIG. 2) may be stored at an origin location (e.g., location A of FIG. 4) for the UAS 500 to exchange as needed. The UAS 500 may increase in weight when it picks up a battery module and decrease in weight when it drops off a depleted battery module. The flight control software may account for the changes in weight to ensure that the pick-up and drop-off process occurs smoothly, with no significant jumps or instability in the flight path of the UAS 500. The processor(s) 530 of the chassis 502 may also be connected to the propeller(s) 506, allowing the processor(s) 530 to transmit instructions to the propeller(s) based on the flight control software. The propeller(s) 506 may then execute the flight adjustments as instructed.

In some embodiments, the processor(s) 530 of the chassis 502 may be connected to processor(s) 530 aboard the primary layer 504, which in turn may be connected to the processor(s) 530 aboard the deployable layer(s) 510. This allows the processor(s) 530 to communicate with each other, exchanging information (e.g., sensor data from the functional component(s) 505b/508 of the layer(s) 504/510 can influence the flight control software's flight adjustments).

The signal connection(s) 534 can enable data transfer between the processor(s) 530. In some embodiments, the signal connection(s) 534 may be severed when the chassis 502, primary layer 504, and/or deployable layer(s) 510 are detached from one another, and reconnected when they are reattached to one another. Conversely, in some embodiments, the signal connection(s) 534 may be wireless such that the chassis 502, primary layer 504, and/or deployable layer(s) 510 do not need to be connected in order for signals to be exchanged.

In some embodiments, the processor(s) 530 aboard each of the layer(s) 504/510 may also be connected to the respective latch(es) 509 of the layer. Thus, the processor(s) 530 can control whether the latch(es) 509 should attach and/or detach the layer(s) 504/510. The processor(s) 530 aboard each of the layer(s) 504/510 may also be connected to the respective functional component(s) 505b/508 (e.g., communications module, battery, charging module, sensor module, data storage, light, payload storage, etc.) of the layer. Thus, the processor(s) 520 can receive data from and/or transmit instructions to each of the functional component(s) 505b/508 as needed.

In some embodiments, the power connection(s) 536 may exchange electrical charge between the chassis 502, primary layer 504, and/or deployable layer(s) 510. For example, the power connection(s) 526 can exchange electrical charge between the batteries of connected layers to power and/or charge the functional component(s) 505b/508. The power connection(s) 536 may be severed when the chassis 502, primary module 504, and/or deployable module(s) 510 are detached from one another, and reconnected when they are reattached to one another.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An unmanned aerial system (UAS) comprising:
   one or more propellers; and
   a plurality of layered modules comprising:
      a primary module configured to guard the one or more propellers; and
      one or more deployable modules configured to attach to and detach from each other, wherein at least one of the one or more deployable modules is configured to attach to and detach from the primary module,
      wherein the one or more deployable modules are configured to be added or dropped during flight of the UAS.

2. The UAS of claim 1, wherein the UAS is configured to perform flight adjustments to compensate for adding or dropping the one or more deployable modules.

3. The UAS of claim 1, wherein the primary module and/or the one or more deployable modules comprise at least one of armor, one or more batteries, one or more charging devices, one or more propulsion modules, one or more GPS modules, one or more sensor modules, one or more lights, one or more explosive devices, one or more electronic attack devices, one or more storage compartments, one or more payloads, one or more audiovisual devices, one or more flotation control devices, or one or more buoyancy control devices.

4. The UAS of claim 1, wherein the one or more deployable modules comprise one or more communication relay modules.

5. The UAS of claim 4, wherein a communication relay module of the one or more communication relay modules comprises one or more electronic devices configured to transmit signals between the UAS and a different communication relay module of the one or more communication relay modules and/or an origin station.

6. The UAS of claim 1, wherein each module of the one or more deployable modules is stacked vertically above and/or below another module of the one or more deployable modules.

7. The UAS of claim 6, wherein a top-most and/or a bottom-most deployable module of the one or more deployable modules is configured to attach to and detach from the primary module.

8. The UAS of claim 1, wherein the one or more deployable modules are configured to be arranged concentrically inside and/or outside of another module of the one or more deployable modules.

9. The UAS of claim 8, wherein an inner-most and/or an outer-most deployable module of the one or more deployable modules is configured to attach to and detach from the primary module.

10. The UAS of claim 1, further comprising one or more sensors configured to collect environmental data associated with one or more of terrain, atmospheric conditions, altitude, and GPS location.

11. The UAS of claim 10, wherein the one or more sensors comprise a camera and the one or more deployable modules comprise a visual code, wherein the UAS is configured to detect an orientation and/or position of a module of the one or more deployable modules dropped during flight of the UAS based on the visual code.

12. A method for operating an unmanned aerial system (UAS) comprising one or more propellers and a plurality of layered modules, the plurality of layered modules comprising a primary module configured to guard the one or more propellers and one or more deployable modules configured to attach to and detach from each other, at least one of the one or more deployable modules being configured to attach to and detach from the primary module, the method comprising:
receiving, from one or more sensors of the UAS, environmental data;
determining one or more drop/pickup locations for the one or more deployable modules based, at least in part, on the environmental data, wherein the one or more deployable modules are configured to be added or dropped during flight of the UAS; and
deploying the one or more deployable modules in the one or more drop/pickup locations.

13. The method of claim 12, further comprising programming the one or more deployable modules based on the environmental data.

14. The method of claim 13, wherein programming the one or more deployable modules comprises setting one or more of frequency, power, signal type, network topology, and transmission rate based on the environmental data.

15. The method of claim 12, wherein the environmental data comprises one or more of terrain, atmospheric conditions, altitude, and GPS location.

16. The method of claim 12, wherein determining the one or more drop/pickup locations for the one or more deployable modules is further based on a predictive model.

17. The method of claim 16, wherein the predictive model is a machine-learning algorithm configured to generate a path of the UAS based on the environmental data.

18. The method of claim 12, wherein the one or more deployable modules comprise one or more communication relay modules configured to be deployed from the UAS.

19. The method of claim 18, wherein the one or more drop/pickup locations are locations which enable the one or more communication relay modules to maintain communication between each other.

20. The method of claim 18, wherein the UAS is configured to maintain communication with an origin station via the one or more communication relay modules.

21. The method of claim 12, further comprising: optimizing a path of the UAS between the one or more drop/pickup locations for the one or more deployable modules.

22. The method of claim 21, wherein optimizing the path of the UAS is based on optimizing power consumption of the UAS.

23. The method of claim 21, wherein optimizing the path of the UAS is based on maximizing a communication path length between the UAS and an origin station.

24. The method of claim 21, wherein optimizing the path of the UAS is based on maximizing a travel path length between the UAS and an origin station.

25. The method of claim 12, wherein the one or more deployable modules comprise at least one of armor, one or more batteries, one or more charging devices, one or more propulsion modules, one or more GPS modules, one or more sensor modules, one or more lights, one or more explosive devices, one or more electronic attack devices, one or more audiovisual devices, one or more storage compartments, one or more payloads, one or more flotation control devices, or one or more buoyancy control devices.

26. The method of claim 12, further comprising:
receiving location data associated with the one or more deployable modules;
maneuvering the UAS to the one or more drop/pickup locations based on the location data; and
picking up the one or more deployable modules via the UAS.

* * * * *